United States Patent
Cortes et al.

(10) Patent No.: US 7,680,037 B2
(45) Date of Patent: Mar. 16, 2010

(54) RESOURCE-SENSITIVE PARSER, METHOD OF PARSING AND SESSION INITIATION PROTOCOL (SIP) NETWORK EMPLOYING THE SAME

(75) Inventors: Mauricio Cortes, Scotch Plains, NJ (US); Jairo O. Esteban, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 996 days.

(21) Appl. No.: 11/069,475

(22) Filed: Mar. 1, 2005

(65) Prior Publication Data

US 2006/0198309 A1    Sep. 7, 2006

(51) Int. Cl.
*H04L 12/16* (2006.01)
*H04L 12/66* (2006.01)
*H04L 12/28* (2006.01)

(52) U.S. Cl. .................... 370/230; 370/352; 370/395.2; 709/223

(58) Field of Classification Search ......... 370/352–356, 370/229, 230, 230.1, 231, 232, 235, 236
See application file for complete search history.

(56) References Cited

U.S. PATENT DOCUMENTS

| | | | | |
|---|---|---|---|---|
| 6,650,619 | B1 * | 11/2003 | Schuster et al. | 370/230 |
| 7,076,544 | B2 * | 7/2006 | Katz et al. | 709/223 |
| 7,453,803 | B1 * | 11/2008 | Bugenhagen | 370/230 |
| 2004/0228352 | A1 * | 11/2004 | Constantinof | 370/395.21 |
| 2005/0088973 | A1 * | 4/2005 | Ibezim et al. | 370/235 |
| 2005/0163126 | A1 * | 7/2005 | Bugenhagen et al. | 370/395.2 |

* cited by examiner

*Primary Examiner*—Steven H Nguyen
(74) *Attorney, Agent, or Firm*—Hitt Gaines, PC

(57) ABSTRACT

The present invention provides a resource-sensitive parser for use with a session initiation protocol (SIP) network. In one embodiment, the resource-sensitive parser includes a resource condition indicator configured to provide an overload indication for a network element in the SIP network. Additionally, the resource-sensitive parser also includes a parsing engine coupled to the resource condition indicator and configured to parse a SIP request employing an overload protection mode corresponding to the overload indication for the network element.

21 Claims, 3 Drawing Sheets

RESOURCE-SENSITIVE PARSER, METHOD OF PARSING AND SESSION INITIATION PROTOCOL (SIP) NETWORK EMPLOYING THE SAME

TECHNICAL FIELD OF THE INVENTION

The present invention is directed, in general, to communication systems and, more specifically, to a resource-sensitive parser, a method of resource-sensitive parsing and a SIP network employing the parser or the method.

BACKGROUND OF THE INVENTION

Organizations worldwide seek to reduce the rising costs associated with various forms of communications. Efforts to consolidate separate voice, fax and data resources offer an opportunity for significant savings. These organizations are pursuing solutions that will enable them to take advantage of excess capacity on broadband data networks to accommodate voice, fax and data transmissions as an alternative to costlier mediums.

Voice over Internet protocol (VoIP) is an Internet protocol (IP) telephony that refers to voice communication services that are transported via an IP-based data network, such as the Internet, rather than the public switched telephone network (PSTN). IP networks use packet or cell switching technologies in contrast to circuit switching technologies used by the PSTN. Basic steps involved in a VoIP telephone call include conversion of the originating analog signal into a signal having a digital format. Then compression and translation of this digital signal into IP packets allows transmission over the IP network. The process is reversed at the receiving end of the transmission thereby again providing an analog signal for reception.

Session initiation protocol (SIP) is a signaling protocol used for creating, modifying and terminating sessions, such as IP voice calls or multimedia conferences, that have one or more participants in an IP network. SIP is a request-response protocol used in VoIP that closely resembles HTTP and SMTP, which are the two Internet protocols that power the World Wide Web and e-mail, respectively. The SIP user agent and the SIP proxy server are basic components that support the use of SIP. The SIP user agent is effectively the end system component for the call, and the SIP proxy server handles the signaling associated with multiple calls. This architecture allows peer-to-peer calls to be accomplished using client-server protocol.

A media gateway links the packet-switched IP network with the circuit-switched PSTN. The media gateway terminates voice calls on the inter-switched trunks from the PSTN, compresses and forms packets of the voice data and delivers the compressed voice packets to the IP network. For call origination in the IP network, the media gateway performs the reverse of this order. The media gateway controller accomplishes the registration and management of resources (provisioning) at the media gateway.

Measurements associated with SIP proxy servers show that they spend about 25 percent of their total message processing time in parsing. SIP parsers share common data structures and routines that include message data structures, string manipulation and memory allocation with the remaining SIP proxy server code. Currently, SIP parsers process the entire SIP message or examine the message sequentially until the mandatory headers have been analyzed thereby making current SIP parsers CPU-intensive algorithms. State of the art SIP parsers use the same number of CPU cycles per message for the SIP message, independent of their current load. Therefore, current CPU consumption is directly proportional to the SIP message load. Further, CPU and network consumption is directly proportional to the size of the SIP message.

Accordingly, what is needed in the art is an enhanced way to parse SIP messages that is more sensitive to parameters such as message, CPU, disk, memory and network element load conditions.

SUMMARY OF THE INVENTION

To address the above-discussed deficiencies of the prior art, the present invention provides a resource-sensitive parser for use with a session initiation protocol (SIP) network. In one embodiment, the resource-sensitive parser includes a resource condition indicator configured to provide an overload indication for a network element in the SIP network. Additionally, the resource-sensitive parser also includes a parsing engine coupled to the resource condition indicator and configured to parse a SIP request employing an overload protection mode corresponding to the overload indication for the network element.

In another aspect, the present invention provides a method of resource-sensitive parsing for use with a session initiation protocol (SIP) network. The method includes providing an overload indication for a network element in the SIP network and parsing a SIP request employing an overload protection mode corresponding to the overload indication for the network element.

The present invention also provides, in yet another aspect, a session initiation protocol (SIP) network. The SIP network includes a plurality of network elements and a resource-sensitive parser. The resource-sensitive parser has a resource condition indicator that provides an overload indication for one of the plurality of network elements, and a parsing engine, coupled to the resource condition indicator, that parses a SIP request employing an overload protection mode corresponding to the overload indication for that one of the plurality of network elements.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
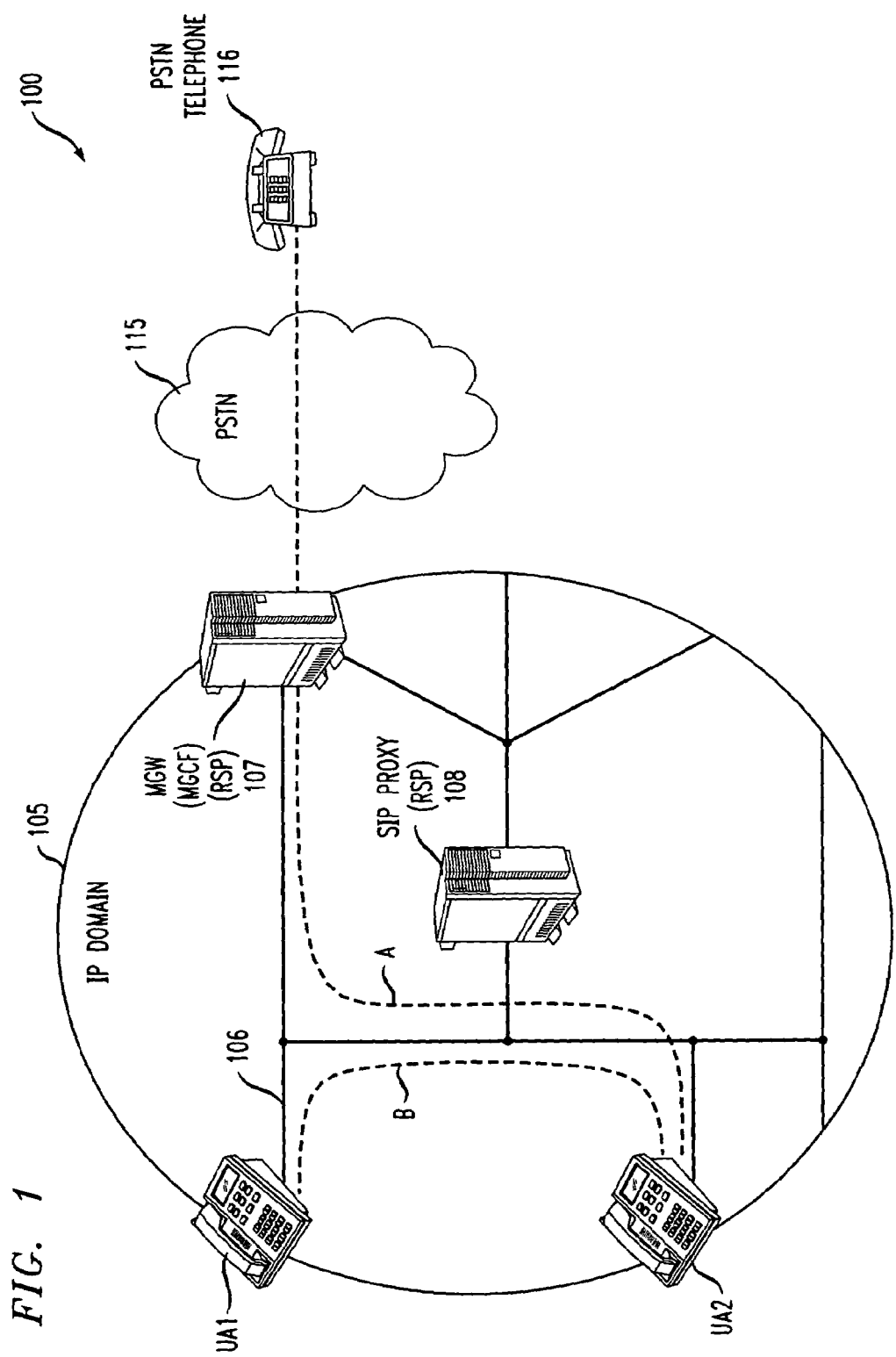
FIG. 1 illustrates a network diagram of a SIP network employing a resource-sensitive parser constructed in accordance with the principles of the present invention.

Referring initially to FIG. 1, illustrated is a network diagram of a SIP network, generally designated 100, employing a resource-sensitive parser constructed in accordance with the principles of the present invention. The SIP network 100 includes an Internet protocol (IP) domain 105 employing a topology of routing options 106 and a public switched telephone network (PSTN) domain 115. The SIP network 100 employs an IP multimedia subsystem (IMS) service architecture that supports the deployment of Voice over IP (VoIP). Although the SIP network 100 is solely a wireline network in the illustrated embodiment, alternative embodiments of the SIP network 100 may employ wireless networks or be solely wireless, as well.

The IP domain 105 has a plurality of network elements, which include a media gateway 107, a SIP proxy server 108 and first and second user agents UA1, UA2. The PSTN domain 115 includes a PSTN telephone 116. The user agents UA1, UA2 may employ a portion of the topology of routing options 106 to support a call with the PSTN telephone 116 employing the media gateway 107 and the SIP proxy server 108, as denoted in path A of FIG. 1. Additionally, the first and second user agents UA1, UA2 may also be employed to support a call employing the SIP proxy server 108, as denoted in path B of FIG. 1. The media gateway 107 performs a bridging function between the IP domain 105 and the PSTN domain 115 thereby enabling calls between the PSTN telephone 116 and the first or second user agent UA1, UA2 within the IP domain 105.

In the illustrated embodiment, each of the media gateway 107 and the SIP proxy server 108 employ a resource-sensitive parser (RSP) to parse SIP requests. Alternative embodiments may also include an RSP in the first and second user agents UA1, UA2, as a particular application may require. The RSP includes a resource condition indicator that provides an overload indication for its associated network element and a parsing engine, coupled to the resource condition indicator, that parses a SIP request employing an overload protection mode corresponding to the overload indication. For example, the overload indication may be based on a resource state selected from the group consisting of a SIP request rate, a network element processing availability such as a CPU load, a network element storage capacity such as available memory associated with the CPU and a network routing condition.

The resource condition indicator typically integrates information concerning each of these resource states to provide the overload indication. The resource condition indicator may employ a polling technique or other monitoring and control mechanisms to receive a response from at least one of the elements in the SIP network 100, thereby providing the overload indication. The parsing engine typically employs two passes in its parsing operation and provides a priority for parsing SIP requests while using the overload protection mode. Additionally, the parsing engine can interrupt its parsing of a SIP request and then provide a continuation by restarting the SIP request parsing as appropriate to a given network load condition or application. Under critical overload conditions, the parsing engine can even reject a SIP request from parsing as a means of reducing the parsing load and consequently the resource usage.

Session initiation protocol includes a congestion control algorithm to avoid overload situations. This protocol allows the SIP proxy server 108 to respond with a 500-level message if call processing resources are scarce. Recipients of a 500-level message may then avoid or delay resending the SIP request to the overloaded SIP proxy server 108 until the overload condition abates. When the RSP detects that resources are scarce, it gives higher priority to SIP messages that free resources and lower priority to requests that consume resources. The SIP proxy server 108 may be CPU-bound and yet to discover a message type, it is required to expend some CPU cycles by invoking its RSP. When CPU-bound, the RSP restricts the parsing operation for those SIP requests having low priority and processes only high priority SIP requests.

Since the RSP employs two passes during the parsing operation, loading and examining each message byte occurs at most two times. The parsing operation consists of an initial, mandatory fast inspection of the message, followed by several random inspections. The first inspection scans until the end of the message is found, and populates certain attributes in the message. These attributes include a message type (i.e., request, response), a response or request type, a table of headers, a message body start and length, and for each header a header type, value start and value length.

If processing the message requires a detailed parsing of a particular header, the RSP inspects the header value and generates an encoded representation, which is stored inside a message data structure. These inspections are considered the second pass of the RSP. Subsequent accesses to the same header will not require additional parsing, since a binary representation already exists at this point. Therefore, the RSP inspects the entire message less than two times, since header names are inspected only once, and header values are inspected at most twice. This approach minimizes the number of CPU cycles required to parse the SIP request message.

Figure 2:
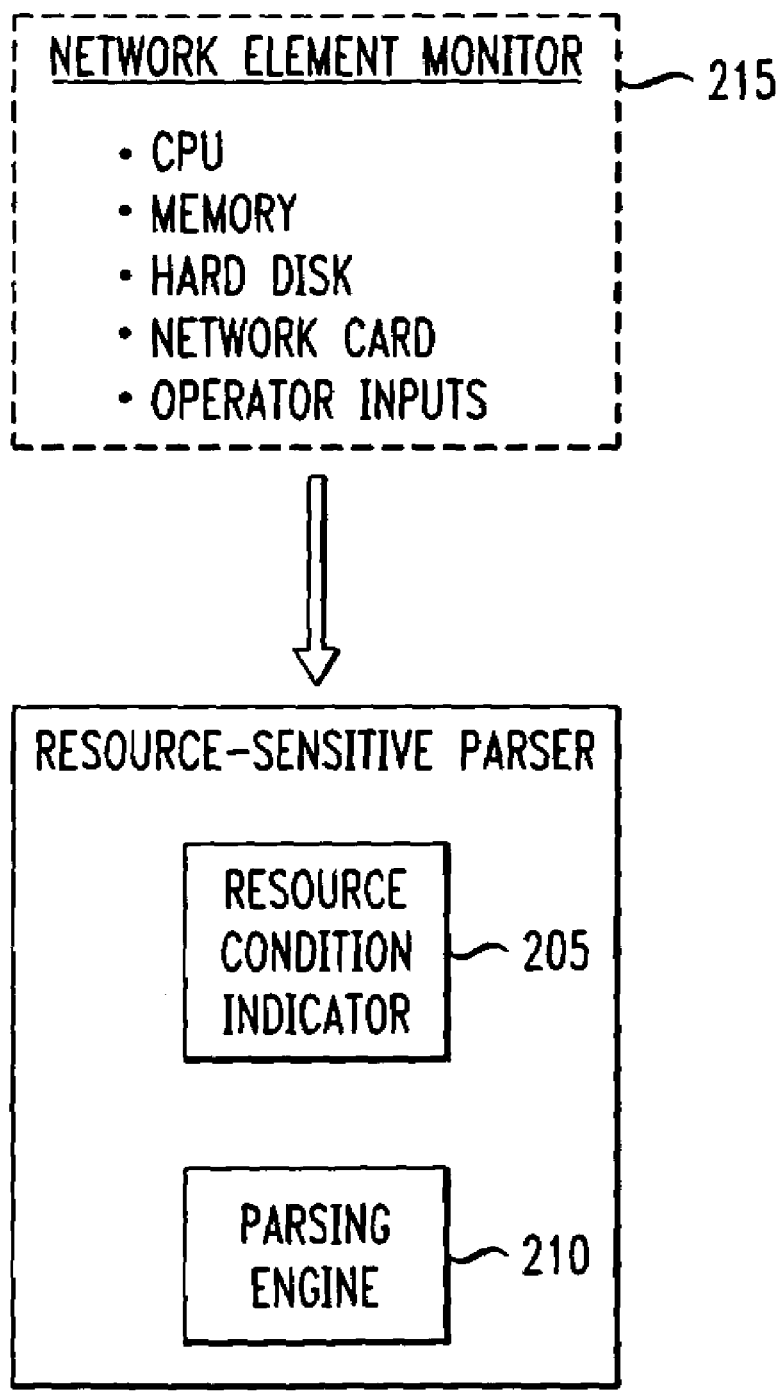
FIG. 2 illustrates a block diagram of an embodiment of a resource-sensitive parser constructed in accordance with the principles of the present invention.

Turning now to FIG. 2, illustrated is a block diagram of an embodiment of a resource-sensitive parser, generally designated 200, for use with a network element and constructed in accordance with the principles of the present invention. The resource-sensitive parser (RSP) 200 includes a resource condition indicator 205 and a parsing engine 210. In the illustrated embodiment, the resource condition indicator 205 is configured to provide an overload indication for a SIP proxy server. The parsing engine 210 is coupled to the network condition indicator 205 and is configured to parse a SIP request employing an overload protection mode that corresponds to the overload indication for the SIP proxy server. Of course, alternative embodiments may employ other network elements such as a media gateway or even individual user agents when appropriately required by a particular application.

In the illustrated embodiment, information provided by a network element monitor 215 is employed to provide the overload indication. This information is normally available within the SIP proxy server and provides a load condition for critical computational components such as CPU and memory including RAM and hard disk, as well as operator imposed constraints that affect operating characteristics. A network card allows monitoring of at least a portion of a SIP network external to the SIP proxy server. Although not specifically shown in FIG. 2, an external resource monitor may also be employed to obtain additional network load information, as required.

The RSP 200 is configurable at runtime to activate the overload protection mode for the parsing engine 210. When the overload protection mode is not activated, each SIP request message is parsed in a normal mode. When the overload protection mode is activated, the RSP 200 employs the parsing engine 210 to perform a complete analysis of SIP request messages related to already existing calls. The parsing engine 210 will perform minimal analysis of those messages that create new calls, returning an error code indicating that only a partial parsing took place.

The application is able to resume parsing and complete the first pass of an INVITE message, for example. In the overload protection mode, the parsing engine 210 also allows an application to remove, reject or discard SIP messages that require additional resources. The parsing engine 210 can determine the message type, thereby helping an application to decide whether to accept or reject processing of a SIP message. In this operating mode, the RSP 200 performs as a cost-effective congestion control mechanism for the SIP network.

In the overload protection mode, the RSP 200 prioritizes the use of CPU cycles associated with a SIP proxy server based on the incoming SIP network traffic. If the network overload indication is caused by a faulty hardware condition (e.g., one CPU is non-operational in a multiprocessor environment) or an unexpectedly high peak traffic condition, the RSP 200 may give a higher priority to non-INVITE messages, for example. Alternatively, if the high load condition status is caused by a faulty network element, the RSP 200 may give higher priority to re-INVITE messages, as well. Faulty network elements can also cause end-point applications to renegotiate their CODECs to lower their media traffic. In this case, the RSP 200 will process the re-INVITE messages to help the network cope with the faulty condition.

As stated earlier, the RSP 200 employs a two-pass parsing approach. The first pass is accomplished in two steps. A first step examines the request line (first line) of the SIP request to determine the message type (e.g., INVITE, 200 OK, etc.). In a second step, the RSP 200 finds a starting address for all message headers. Then, in a second pass, the RSP 200 allows applications to parse any header on demand. At low SIP request loads, the parsing engine 210 performs the first parsing pass. At high loads, the first step of the first pass is executed to determine an incoming message type. The resource condition indicator 205 assigns a higher processing priority to messages that will free resources such as BYE, CANCEL, re-INVITE, and final responses. The resource condition indicator 205 assigns the next highest priority to other non-INVITE requests such as OPTIONS, REGISTER, join extension, and replace extension. A lowest priority is assign by the resource condition indicator 205 to original INVITE requests, since these requests will consume more CPU and memory than any other SIP message.

An additional problem may be imposed by SIP syntax in differentiating an original INVITE from a re-INVITE, join extension, or replace extension, since these messages have the same request line. Therefore, the parsing engine 210 incrementally performs the first pass until it finds a TO header, a JOIN header, or a REPLACE header. If the TO header is encountered first, the presence of the TO tag will determine the message type. If the TO tag is absent, the message is an original INVITE. Otherwise, the SIP request message can be a re-INVITE or some extension. If JOIN or REPLACE headers are found, the SIP request message will be assigned the second highest priority corresponding to the JOIN or REPLACE extension.

The RSP 200 is called upon to determine SIP message header types and, therefore, it minimizes expensive operations, such as case insensitive string comparisons. The RSP 200 follows a SIP express router (SER) approach by using the first four bytes of the header name. In addition, the RSP 200 includes the string length in the hashing function that returns an index to a table where the candidate header name is stored. Then, a single case insensitive comparison takes place. The hashing function can be a perfect-hashing routine, so that no collisions occur. This approach takes advantage of a 32-bit architecture found in most machines by inspecting groups of four bytes instead of a byte-per-byte approach.

SIP applications can read incomplete messages whenever SIP messages are sent through a TCP connection. The RSP 200 can detect that a message is incomplete. When additional bytes arrive in the same TCP connection, the application can append them to the message and resume parsing. The RSP 200 typically does not have to re-parse the message. Instead, it restarts its analysis with the new bytes. It is also possible that more than one message is retrieved from the network in a single input-output operation. The RSP 200 assists the application in separating the incoming messages properly.

In one embodiment, the RSP 200 reads directly into the raw text area of a message data structure. The RSP 200 can determine the actual end of the message and populate the message data structure in the first inspection. If a single message is read, the application can process the message immediately. If a partial message is retrieved, the application can store the message data structure to restart the parsing as soon as additional bytes become available. If more than one message is available, the application can move the remaining bytes to a newly allocated message data structure.

The benefits of this feature in terms of performance for the application are fewer input-output operations, less memory copying and a single inspection. The RSP 200 analyses the incoming text, and at the same time is able to determine the end of message. Parsing information is stored for partial messages such that parsing can restart when the remaining text arrives.

Figure 3:
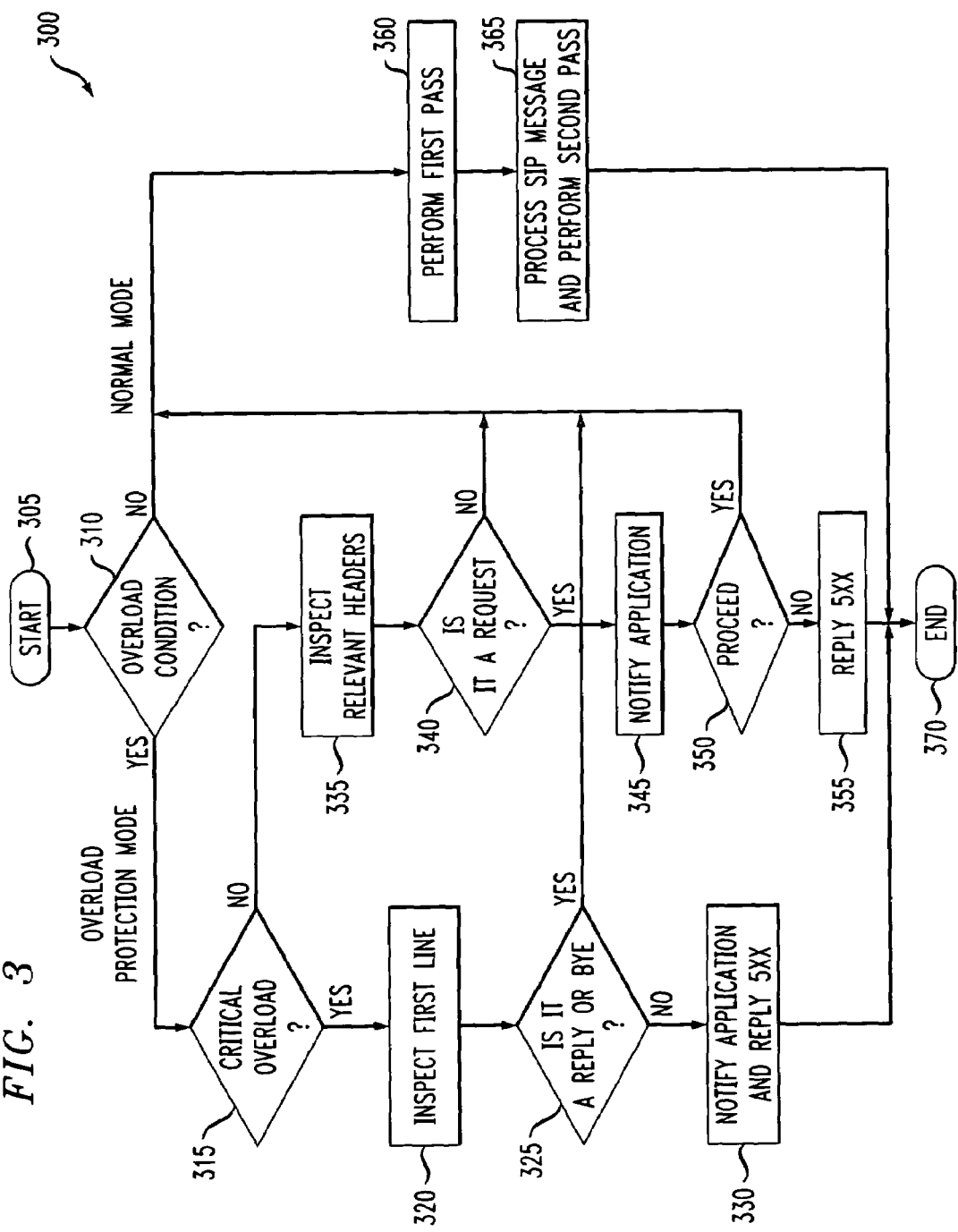
FIG. 3 illustrates a flow diagram of an embodiment of a method of resource-sensitive parsing carried out in accordance with the principles of the present invention.

Turning now to FIG. 3, illustrated is a flow diagram of an embodiment of a method of resource-sensitive parsing, generally designated 300, carried out in accordance with the principles of the present invention. The method 300 employs resource-sensitive parsing for use with a SIP request in a SIP network and starts in a step 305. Then, in a first decisional step 310 it is determined if an overload condition exists that would provide an overload indication in a network element. The overload condition corresponds to at least one required resource associated with the network element operating at greater than about 75 percent of its capacity. If there is an overload indication provided, a second decisional step 315 determines if a critical overload condition exists that provides an overload indication corresponding to a required resource operating at greater than about 90 or 95 percent of its capacity.

If there is a critical overload indicated in the second decisional step 315, a first line of the SIP request is inspected in a step 320. A third decisional step 325 determines if the request is a REPLY or a BYE. If the request is a REPLY or a BYE, the request is processed in a step 360 as though it were a normal processing mode, since processing either of these will actually relinquish resources. The step 360 performs a first pass of the request, which populates an index table in the internal representation of the message. Then, in a step 365, a second pass parses only a handful of mandatory headers, and the message is sent to the application wherein it is processed appropriately. The method 300 then ends in a step 370. If the third decisional step 325 determines that it is not a REPLY or a BYE, the application is notified and a REPLY 5XX is provided in a step 330 indicating that the request is being dropped. Then, the method 300 again ends in the step 370.

If the second decisional step 315 determines that a critical overload does not exist, relevant headers are inspected in a step 335. Then, a fourth decisional step 340 determines if it is a request and the application is notified in a step 345.

The application provides a decision in a fifth decisional step 350 whether it wants to proceed in processing the request. If processing the request, the method 300 again reverts to the normal mode of processing, which starts in the step 360. If it is decided not to proceed in the fifth decisional step 350, a 5XX is again provided in a step 355 and the method 300 again ends in the step 370.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or grouping of the steps is not a limitation of the present invention.

In summary, embodiments of the present invention employing a resource-sensitive parser, a method of resource-sensitive parsing and a SIP network employing the parser or the method have been presented. Advantages include the ability to parse a SIP message request in a normal mode when a network element employing the parser or the method is not in an overloaded condition. And, conversely, to parse employing an overload protection mode when an overload indication is provided. Benefits of the overload protection mode, in terms of performance for the application, includes the ability to parse SIP requests in a manner that facilitates abatement of the overload condition.

Although the present invention has been described in detail, those skilled in the art should understand that they can make various changes, substitutions and alterations herein without departing from the spirit and scope of the invention in its broadest form.

What is claimed is:

1. A resource-sensitive parser for use with a session initiation protocol (SIP) network, comprising:
   a resource condition indicator configured to provide an overload indication for one of a plurality of a network elements in said SIP network based on information provided by a network element monitor, external to said resource-sensitive parser, employed to provide said overload indication of said plurality of network elements, and
   a parsing engine coupled to said resource condition indicator and configured to parse a SIP request employing an overload protection mode corresponding to said overload indication for said network element, said parsing employing a two-pass parsing approach based on said overload indication.

2. The parser as recited in claim 1 wherein said overload indication is based on a resource state selected from the group consisting of:
   a network element processing availability;
   a network element storage capacity;
   a SIP request rate; and
   a network routing condition.

3. The parser as recited in claim 1 wherein said network element is selected from the group consisting of:
   a SIP proxy server; and
   a media gateway.

4. The parser as recited in claim 1 wherein said overload protection mode provides a priority for parsing said SIP request.

5. The parser as recited in claim 1 wherein said overload protection mode provides an interruption in parsing said SIP request.

6. The parser as recited in claim 5 wherein said overload protection mode provides a continuation in parsing said SIP request.

7. The parser as recited in claim 1 wherein said overload protection mode provides a rejection to parsing said SIP request.

8. A method of resource-sensitive parsing for use with a session initiation protocol (SIP) proxy server in a SIP network, said SIP proxy server including a resource-sensitive parser and an external network element monitor, said method comprising:
   providing information from said external network element monitor of a plurality of network elements in said SIP network,
   providing an overload indication from said information from said external network element monitor employed to provide said overload indication for one of said plurality of network elements in said SIP network, and
   parsing, by said resource-sensitive parser, a SIP request employing an overload protection mode corresponding to said overload indication for said one of a plurality of network elements, said parsing employing a two-pass parsing approach based on said overload indication.

9. The method as recited in claim 8 wherein said overload indication is based on a resource state selected from the group consisting of:
   a network element processing availability;
   a network element storage capacity;
   a SIP request rate; and
   a network routing condition.

10. The method as recited in claim 8 wherein said network element is selected from the group consisting of:
    a SIP proxy server; and
    a media gateway.

11. The method as recited in claim 8 wherein said overload protection mode provides a priority for parsing said SIP request.

12. The method as recited in claim 8 wherein said overload protection mode provides an interruption in parsing said SIP request.

13. The method as recited in claim 12 wherein said overload protection mode provides a continuation in parsing said SIP request.

14. The method as recited in claim 8 wherein said overload protection mode provides a rejection to parsing said SIP request.

15. A session initiation protocol (SIP) network, comprising:
    a plurality of network elements,
    a network element monitor; and
    a resource-sensitive parser, including:
      a resource condition indicator that provides an overload indication for one of said plurality of network elements based on information provided by said network element monitor employed to provide said overload indication of said plurality of network elements, and
      a parsing engine, coupled to said resource condition indicator, that parses a SIP request employing an overload protection mode corresponding to said overload indication for said one of said plurality of network elements, said parsing employing a two-pass parsing approach based on said overload indication.

16. The network as recited in claim 15 wherein said overload indication is based on a resource state selected from the group consisting of:
    a network element processing availability;
    a network element storage capacity;
    a SIP request rate; and
    a network routing condition.

17. The network as recited in claim 15 wherein said one of said plurality of network elements is selected from the group consisting of:

a SIP proxy server; and
a media gateway.

18. The network as recited in claim 15 wherein said overload protection mode provides a priority for parsing said SIP request.

19. The network as recited in claim 15 wherein said overload protection mode provides an interruption in parsing said SIP request.

20. The network as recited in claim 19 wherein said overload protection mode provides a continuation in parsing said SIP request.

21. The network as recited in claim 15 wherein said overload protection mode provides a rejection to parsing said SIP request.

* * * * *